US005557683A

United States Patent [19]

Eubanks

[11] Patent Number: 5,557,683

[45] Date of Patent: Sep. 17, 1996

[54] IN-VEHICLE DRUM SIMULATOR AND MIXER

[76] Inventor: Terry L. Eubanks, 433 Cambridge, Royal Oak, Mich. 48067

[21] Appl. No.: 504,901

[22] Filed: Jul. 20, 1995

[51] Int. Cl.[6] .......... H04B 1/00

[52] U.S. Cl. .......... 381/86; 381/119; 84/625; 84/660; 84/697

[58] Field of Search .......... 381/86, 119; 84/625, 84/660, 697, 723, 730, 737, 743

[56] References Cited

U.S. PATENT DOCUMENTS

| | | |
|---|---|---|
| 4,418,598 | 12/1983 | Klynas . |
| 4,867,028 | 9/1989 | Jones . |
| 4,905,561 | 3/1990 | Mizuno . |
| 4,926,738 | 5/1990 | Kondo et al. . |
| 5,062,341 | 11/1991 | Reiling et al. . |
| 5,223,654 | 6/1993 | Fujita . |
| 5,223,655 | 6/1993 | Watanabe et al. . |
| 5,227,574 | 7/1993 | Mukaino . |

*Primary Examiner*—Curtis Kuntz
*Assistant Examiner*—Minsun Oh
*Attorney, Agent, or Firm*—Harness, Dickey & Pierce, P.L.C.

[57] ABSTRACT

An in-vehicle drum simulator and mixer for enabling an automobile passenger to create and overlay percussive sounds onto the audio portion of a radio, tape player, cassette disk player, and the like. One or a plurality of touch sensors distributed in selected locations within the vehicle provide electronic input signals upon impact to a drum simulator which generates an output signal in relation to the particular impacted touch sensors. An audio mixer receives the drum simulator output signal and an output signal form the radio, or the like audio signal source, and overlays the drum sounds onto the radio output signal. Thus, the passenger can actively play along with the radio.

18 Claims, 1 Drawing Sheet

IN-VEHICLE DRUM SIMULATOR AND MIXER

This invention is directed to vehicle sound systems and the like. More particularly, this invention is directed to a drum simulator and mixer which may be installed in the vehicle so that the operator may overlay percussive sounds onto an audio signal output by a radio, compact disk, or tape player.

BACKGROUND OF THE INVENTION

A typical automobile or other vehicle sound system includes a source of an electronic audio signal in which is then input to speakers to transform the electronic signal into audible sound for the listening pleasure of the vehicle occupants. The source of an audio signal is often one or more of an AM/FM radio, a tape player, or a compact disk (CD) player. Each of these sources of audio signal receives input from a particular form of media which varies in accordance with the particular audio signal source, such as a radio, tape player, etc. The audio signal source then transposes the input signal from the media into an electronic output signal to the audio speakers. The audio speakers receive the electronic signals and decoded the electronic signal into audible sounds output by the speakers.

Overall, the underlying formats of in-vehicle audio systems has remained relatively stagnant. Developments such as FM stereo, cassette tape players, and compact disk players have generally improved the quality of the sound systems by improving the input media to the sound system. Other developments, such as graphic equalizers, and four, six, eight (or more) speaker sound systems have improved the overall quality of the in-vehicle listening experience.

While the quality of input media and overall fidelity of vehicle sound systems has evolved and improved, the vehicle sound system operators have remained relatively passive operators. Their input to the system usually consists of changing the radio station, fast forwarding, or rewinding cassette tapes, or randomly selecting the available tracks of the compact disk. However, all of the above-mentioned acts relate to the selection of music, not the active making of music. The operator of current in-vehicle sound systems merely selects the input media and a specific track thereon so that the desired electronic output signals can be generated to the speakers. However, no vehicles sound system enables the user to participate in actually generating the input signals to the vehicle sound system so that the sound system can then generate the corresponding electronic signal to drive the speakers to provide an audible output.

Therefore, it is desirable to provide an in-vehicle sound system in which the user interacts with the sound system in order to generate musical input signals for mixing with traditional vehicle audio signals for output through the speaker system.

SUMMARY OF THE INVENTION

An apparatus for overlaying percussive sounds onto an audio signal output by a signal source in a vehicle. The apparatus includes a touch sensor for generating an electrical signal in response to an impact detected by the touch sensor. The touch sensor provides an input to a drum simulator for receiving the electrical signal from the touch sensor and outputting a second audio signal in response to the electrical signal, where the second audio signal defines a percussive sound. An audio mixer receives the first and second audio signals and mixes the first and second audio signal to output a composite signal which includes the first and second audio signals. Further, he signal source, the touch sensor, the drum simulator, and the audio mixer are located in the vehicle.

From the subsequent detailed description taken in conjunction with the accompanying drawings and subjoined claims, other objects and advantages of the present invention will become apparent to those skilled in the art.

DETAILED DESCRIPTION OF THE INVENTION

Figure 1:
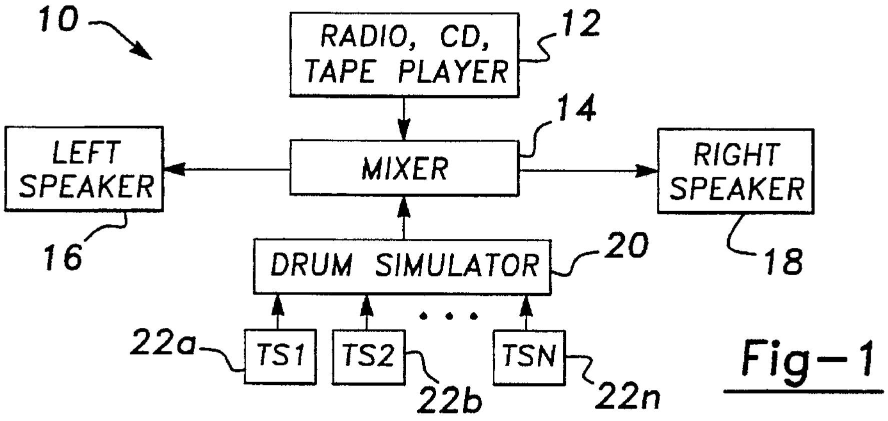
FIG. 1 depicts a first embodiment of the in-vehicle drum simulator and mixer arranged according to the principle of the present invention.

FIG. 1 depicts a block diagram a first embodiment of the in-vehicle drum simulator and mixer 10 arranged according to the principles of the present invention. The drum simulator and mixer 10 includes an audio signal source 12, shown in FIG. 1 as an AM/FM radio, tape player, and/or compact disk (CD) player. The radio, tape player, and/or CD player 12 operate as is well known to one skilled in the art. For example, the radio typically includes a receiver which receives an incoming electromagnetic signal and outputs an electronic signal varying in accordance with the received electromagnetic signal. If audio signal source 12 is represented by a compact disk player, the compact disk player uses a laser to retrieve information optically encoded in a digital format onto the compact disk. Further, as is well known in the art, a tape player decodes information stored magnetically on tape by passing the tape over a magnetic pick-up which then decodes the magnetic signal from the tape.

The audio signal source 12 of FIG. 1 outputs an electronic signal carrying the audio information. The electronic signal is input to a mixer 14. In a first operating mode of the in-vehicle drum simulator and mixer 10, the mixer 14 merely outputs the signal to the left speaker 16 and right speaker 18. In another mode of operation, the mixer 14 also receives an audio signal from a drum simulator 20. The drum simulator 20 generates sounds in response to impact upon one or a number of touch sensors 22*a*, 22*b*, . . . , 22*n*. Drum simulator 20 operates in a manner that is well known to those skilled in the art.

In operation, an operator impacts one or a plurality of the touch sensors 22*a*, 22*b*, . . . , and/or 22*n*. In response to impact, touch sensors, 22*a*–22*n* output a signal to drum simulator 20. Drum simulator 20 in turn outputs a signal varying in accordance with the particular touch sensor or sensors 22*a*–22*n* impacted by the operator. The resultant electronic signal is then output by drum simulator 20 to mixer 14. Mixer 14 in turn then combines the electronic signals output by audio signal source 12 and drum simulator 20. The combined signals are then output to the respective left speaker 16 and right speaker 18. In this manner, the user may overlay simulated drum sounds output by drum simulator 20 onto the normal audio signal output by audio signal source 12.

A conventional drum simulator 20 is well known to those skilled in the art. Drum simulator 20 receives input signals from one or a plurality of touch sensors 22*a*, 22*b*, and 22*n*. Each touch sensor 22*a*, 22*b*, and 22*n* represents a potentially different percussive sound which drum simulator 20 may be configured to generate in accordance with impact upon a particular touch sensor. Of course, it will be understood by one skilled in the art that depending on the particular drum simulator 20, drum simulator 20 may be reconfigured so that a particular touch sensor, touch sensor 22*a*, for example, may cause drum simulator 20 to output a different percussive sound in accordance with one particular configuration of drum simulator 20. In a different configuration, drum simulator 20 may also output a different percussive sound in response to impact upon the same touch sensor.

Touch sensors 22*a*, 22*b*, and 22*n* may be located at a plurality of locations within the vehicle, preferably in a location which facilitates use by a vehicle occupant. For example, touch sensor 22*a* may be located on the center yoke of the steering wheel, touch sensor 22*b* may be located upon the top side of the dashboard, and touch sensor 22*n* may be located by the left or right foot of the driver. Of particular importance, the touch sensors 22*a*–22*n* must be placed in a location which encourages and facilitates use, but does not in any way impact the overall safety of the vehicle or the vehicle occupants. Touch sensors 22*a*–22*n* may be positioned in permanent locations about the vehicle. In the alternative, touch sensors 22*a*–22*n* may be non-permanent touch sensors which are selectively positioned. Positioning depends on the particular desires of the operator. For example, the touch sensors 22*a*–22*n* may be placed so that occupants other than the driver may operate the touch sensors. In another example, touch sensors 22*a*–22*n* may be positioned to facilitate operation by a passenger in the back seat of the vehicle or a passenger in the front passenger seat of the vehicle.

Figure 2:
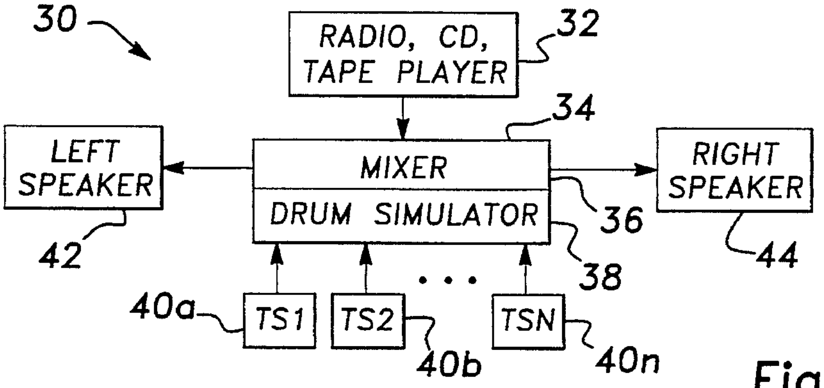
FIG. 2 depicts a second embodiment of the in-vehicle drum simulator and mixer further in accordance with the principles of the present invention.

FIG. 2 depicts a second embodiment of the in-vehicle drum simulator and mixer 30. The in-vehicle drum simulator and mixer 30 includes an audio signal source 32 which operates as described with respect to FIG. 1. The audio signal source 32 outputs an electronic signal carrying audio information to an integral mixer and drum simulator 34. The integral mixer and drum simulator 34 includes a mixer 36 and a drum simulator 38. The mixer 36 operates as described above respect to mixer 14 of FIG. 1. Similarly, drum simulator 38 operates as described with respect to drum simulator 20 of FIG. 1. The integral mixer and drum simulator 34 receives input signals from audio signal source 32 and also receives input signals from touch sensors 40*a*, 40*b*, and 40*c*. Touch sensors 40*a*, 40*b*, and 40*c* operate similarly to touch sensors 22*a*, 22*b*, and 22*n* as described with respect to FIG. 1.

The integral mixer and drum simulator 34 receives the respective input signals and combines the respective audio signals to define a composite signal which is output by integral mixer and drum simulator 34 to left speaker 42 and right speaker 44. The integral in-vehicle mixer and drum simulator 34 provides the benefit of a potentially significant space savings by combining not only the cabinets of mixer 36 and drum simulator 38 of FIG. 1, but also provides the added benefit that some circuitry could be commonized between the two components, yielding yet an increased space savings in the form of one smaller cabinet. Such space savings is particularly advantageous considering that one or all of the above-described components are candidates for in-dash installation where space is at a premium in light of the several components which ideally are placed in the dashboard area.

Figure 3:
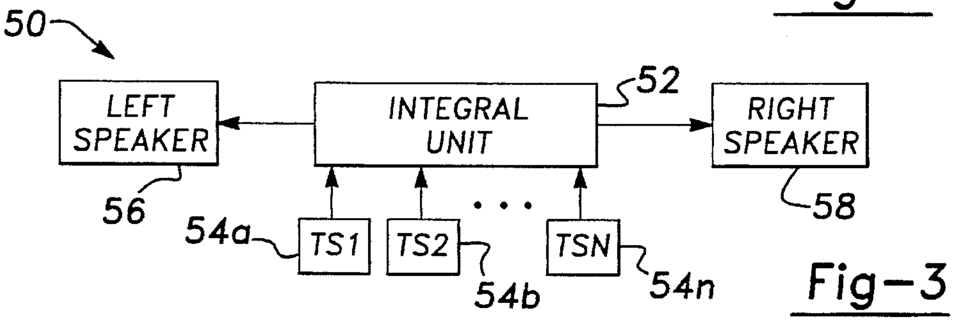
FIG. 3 depicts a third embodiment of an in-vehicle drum simulator and mixer further in accordance with the principles of the present invention.

FIG. 3 depicts yet a third embodiment of the in-vehicle drum simulator and mixer 50 according to the principles of the present invention. The in-vehicle drum simulator and mixer 50 of FIG. 3 includes an integral unit 52. Integral unit 52 comprises the integral mixer and drum simulator 34 combined with the audio signal source 32 of FIG. 2 to define the integral unit 52. Integral unit 52 operates as described with respect to FIG. 2 except that the audio signal source 32 is also integrated into the integral unit 52. One or a plurality of touch sensors 54*a*, 54*b*, and 54*n* are similarly placed about the automobile for impact by the vehicle occupants.

Touch sensors 54*a*, 54*b*, and 54*n* output an electronic signal input to integral unit 52. The signal output by each of touch sensors 54*a*, 54*b*, and 54*n* varies in accordance with the particular sensor and the configuration of the drum simulator (not shown) of integral unit 52, but generally operates as described above with respect to FIGS. 1 and 2. The integral unit receives the electronic signal output by touch sensors 54*a*, 54*b*, and 54*n* and combines the output of an audio signal source (in integral unit 52) with the output of the drum simulator (in integral unit 52) and outputs a composite signal to left speaker 56 and right speaker 58.

Figure 4:
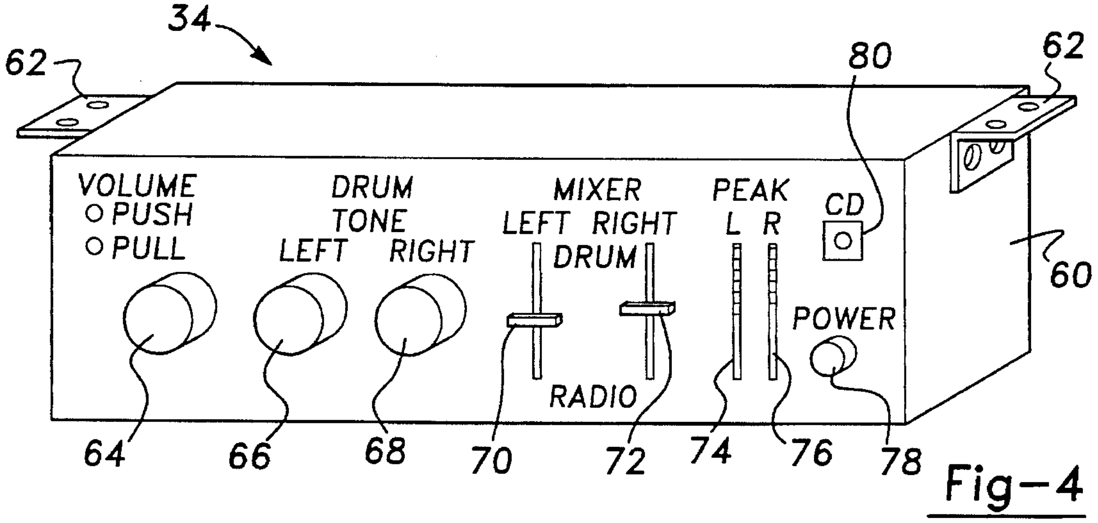
FIG. 4 is an exemplary, integral unit for the in-vehicle drum simulator and mixer.

FIG. 4 is presents an exemplary packaging of the controls for the integrated mixer and drum simulator 34 shown in FIG. 2. The integral mixer and drum simulator 34 includes a case 60 which houses the electronic circuit components for effecting the combined mixing and drum simulation functions. The case 60 is preferably mounted in proximity to the dashboard in one of a number of possible installations well known in the art. For example, the case 60 may be fixed to the top deck of a dashboard by installing a velcro strip on the underside of case 60. A corresponding velcro strip may then be mounted to the dashboard to receive the strip mounted to the underside of the case 60. In this manner, the case 60 may be easily removed and installed on the vehicle. Alternatively, the case 60 may be mounted underneath the dashboard using ears 62 for affixing the case 60 to the dashboard.

The case 60 includes a volume control 64. Volume control 64 modulates the volume of either the left or right speaker depending on the operating position of the volume control 64. When the operator pushes the volume control 64 towards the case 60, the operator controls the volume of the left channel by rotating the volume control 64. Similarly, the operator may control the volume of the right channel by pulling and rotating the volume control 64. The case 60 also includes a left drum tone control 66 and a right drum tone control 68. The drum tone controls 66 and 68 enable the user to control the bass and treble of the left and right channels by rotating the left drum tone control 66 and the right drum tone control 68, respectively.

A left mixer control 70 and a right mixer control 72 mix the drum simulator 38 and audio signal source 32 levels. The left and right mixer controls 70 and 72 are slide controls. The slide controls enable the operator to modulate the balance between the drum simulator output signal and the radio output signal. By moving the mixer controls 70 and 72 upward, the operator increases the drum signal and correspondingly decreases the radio signal. Correspondingly, when the operator slides the mixer controls 70 and 72 downwardly, the radio signal is increased and the drum control is correspondingly decreased.

The case 60, also includes a left channel meter 74 and right channel meter 76. Channel meters 74 and 76 are typically light based meters which indicates signal levels in a bar format in accordance with the number of illuminated lights on each respective meter. Channel meters 74 and 76 enable the operator to determine the overall output of the respective left and right channels. A power switch 78 activates and deactivates the integral mixer and drum simulator 34 with alternative depressions of power switch 78. Additional components, such as a tape player or CD player may be input directly into the integral mixer and drum simulator 34 through the use of an external input jack 80. External input jack 80 enables operation of the integral mixer and drum simulator in-vehicle audio systems only having one particular source of an audio output signal.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An apparatus for overlaying percussive sounds onto a first audio signal output by a signal source in a vehicle, comprising:

a touch sensor for generating an electrical signal in response to an impact detected by the touch sensor;

a drum simulator for receiving the electrical signal from the touch sensor and outputting a second audio signal in response to the electrical signal, the second audio signal defining a percussive sound; and an audio mixer for receiving the first and second audio signals and mixing the first and second audio signal to output a composite signal including the first and second audio signals, where the signal source, the touch sensor, the drum simulator, and the audio mixer are located in the vehicle.

2. The apparatus of claim 1 wherein the touch sensor outputs an electrical signal varying in accordance with the magnitude of the impact upon the touch sensor.

3. The apparatus of claim 1 further comprising a speaker for receiving the overlaid audio signal and generating a sound output varying in accordance with the audio signal.

4. The apparatus of claim 1 further comprising a plurality of touch sensors.

5. The apparatus of claim 4 wherein the drum simulator outputs an audio signal defining a predetermined percussive sound in accordance with the electronic signal output by a particular touch sensor of the plurality.

6. The apparatus of claim 4 wherein each of the plurality of touch sensors may be mounted under one of the dashboard, the steering wheel, and in the floor of the vehicle.

7. The apparatus of claim 1 wherein the touch sensor outputs an electrical signal varying in accordance with the magnitude of the impact upon the touch sensor.

8. The apparatus of claim 1 wherein the audio mixer modulates the level of each of the first audio signal and the second audio signal to properly proportion each audio signal defining the composite signal.

9. The apparatus of claim 1 wherein the audio signal source is at least one of a radio, a tape player, and a compact disk player.

10. A vehicle sound system, comprising:

an audio signal source which outputs a first audio signal;

a touch sensor for generating an electrical signal in response to an impact detected by the touch sensor;

a drum simulator for receiving the electrical signal from the touch sensor and outputting a second audio signal in response to the electrical signal; and an audio mixer for receiving the first and second audio signals and mixing the first and second audio signal to output a composite signal including the first and second audio signals, where the audio signal source, the touch sensor, the drum simulator, and the audio mixer are located on the vehicle.

11. The apparatus of claim 10 wherein the touch sensor outputs an electrical signal varying in accordance with the magnitude of the impact upon the touch sensor.

12. The apparatus of claim 10 further comprising a speaker for receiving the overlaid audio signal and generating a sound output varying in accordance with the audio signal.

13. The apparatus of claim 10 further comprising a plurality of touch sensors.

14. The apparatus of claim 13 wherein the drum simulator outputs an audio signal defining a predetermined percussive sound in accordance with the electronic signal output by a particular touch sensor of the plurality.

15. The apparatus of claim 13 wherein each of the plurality of touch sensors may be mounted under at least one of the dashboard, the steering wheel, and in the floor of the vehicle.

16. The apparatus of claim 10 wherein the touch sensor outputs an electrical signal varying in accordance with the magnitude of the impact upon the touch sensor.

17. The apparatus of claim 10 wherein the audio mixer modulates the level of each of the first audio signal and the second audio signal to properly proportion each audio signal defining the composite signal.

18. The apparatus of claim 10 wherein the audio signal source is at least one of a radio, a tape player, and a compact disk player.

* * * * *